Nov. 29, 1938.  F. W. CALDWELL  2,138,370

METHOD OF MAKING PROPELLER BLADES

Original Filed April 21, 1931

INVENTOR.
Frank W. Caldwell
BY Harris G. Luther
ATTORNEY

Patented Nov. 29, 1938

2,138,370

UNITED STATES PATENT OFFICE 2,138,370

METHOD OF MAKING PROPELLER BLADES

Frank W. Caldwell, Hartford, Conn., assignor to United Aircraft Corporation, East Hartford, Conn., a corporation of Delaware Original application April 21, 1931, Serial No. 531,685, now Patent No. 2,032,254, dated February 25, 1936. Divided and this application February 21, 1936, Serial No. 65,144

6 Claims. (Cl. 29—156.8)

This invention relates generally to propellers for aircraft and more particularly to controllable pitch propellers for aircraft.

An object of the invention is to provide a propeller for aircraft having blades, the pitch of which may be controlled during flight of the aircraft.

A further object is to provide improved methods of making and assembling controllable pitch propeller mechanisms.

In the accompanying drawing, Figure 1 is a longitudinal section of the propeller taken on a plane at right angles to the plane of rotation thereof with portions of the mechanism shown in full.

Figure 1:
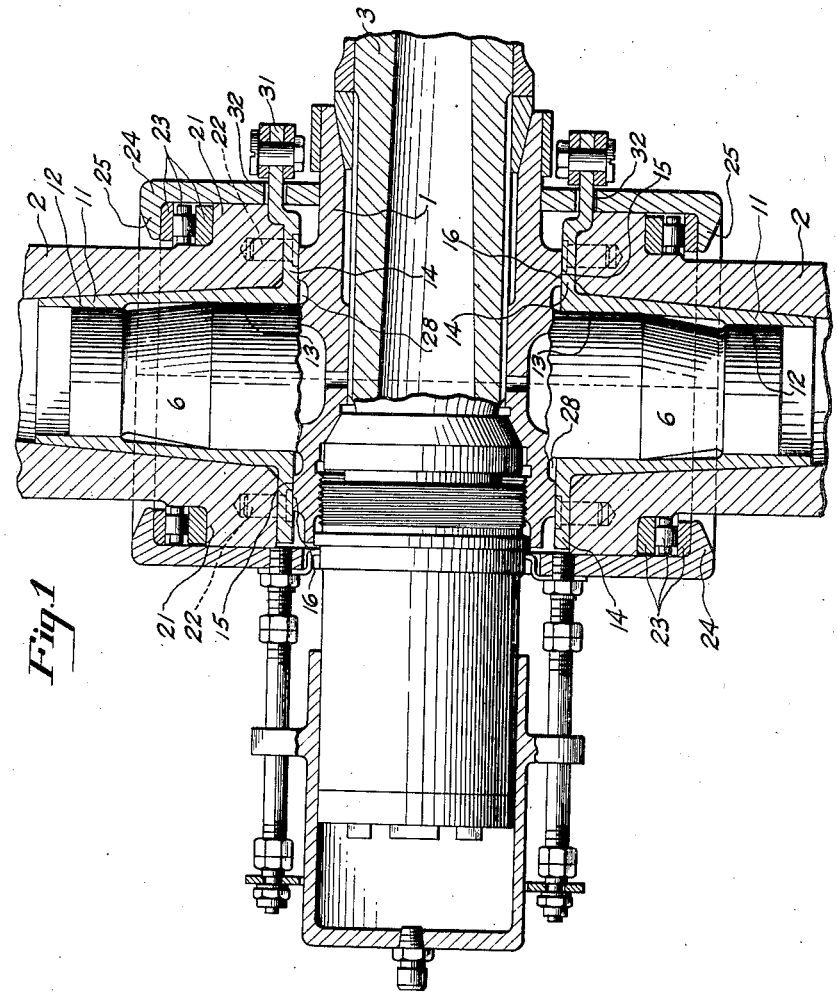

Referring to Figure 1 of the drawing, a controllable pitch propeller embodying my invention comprises, in general, a hub structure 1 upon which is mounted a plurality of propeller blades 2, extending from the hub 1 in the plane of rotation and with their axes in alignment. The hub 1 is carried, in the usual manner, on the end of a hollow engine shaft 3. The end of the shaft 3 is tapered to fit a complementary tapered bore in the hub 1, and the exterior of the shaft is splined to mate with a similarly splined interior surface of the hub.

The hub is a one-piece structure comprising in general a substantially cylindrical body portion from which extend integrally formed arms 6 to constitute a spider having studs on which the blades 2 are mounted. The particular blades 2 shown in the drawing are similar to conventional metallic blades insofar as their general shape and aerodynamic qualities are concerned.

The roots or shanks of the blades are hollow, and each blade root is bored and fitted with an internal sleeve 11 having internal bearing surfaces 12 and 13 that engage complementary journals on the arms 6. The bearing surfaces on the arms function to transmit driving torque to the blades and permit them to be turned about their longitudinal axes for adjusting the pitch. The sleeve 11 is provided with an integral laterally extending flange 14 that abuts against the end of the blade 2 and is provided with a laterally disposed bearing surface 15 that engages a complementary annular plane bearing surface 16 on the body portion of the hub 1 encircling each stud 6 to cooperate with the stud in rigidly holding the blade 2.

The end of the blade adjacent the flange 14 is provided with an integral outwardly turned flange 21 to which the flange 14 is secured by dowels or screws 22. For holding the blades 2 on the studs 6 with the flanges 14 tightly against the bearing surfaces 16, each blade is provided with an antifriction thrust bearing 23 disposed to encircle the blade shank and to bear against the outwardly turned flange 21. The bearings 23 on the two blades are inter-connected by a thrust resisting structure or barrel 24, having, at its ends, inwardly turned flanges 25 that engage the outer races of the thrust bearings.

As shown, the barrel 24 is split along its longitudinal axis in such manner that it may be fitted over the blade roots and the semi-cylindrical halves secured together by suitable bolts (not shown). Openings are provided in substantially the middle of each barrel half to permit it to fit over the cylindrical body portion of the hub 1. The barrel 24 is made to fit the bearings 23 closely so that the blades 2 are held rigidly in position but may be turned about their longitudinal axes upon application of relatively large twisting force.

Figure 2:
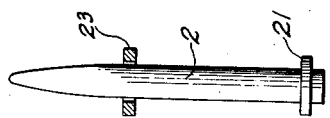
Figure 2 is a diagrammatic representation of a blank for a propeller blade showing a method of applying a thrust bearing to it.
Figure 3:
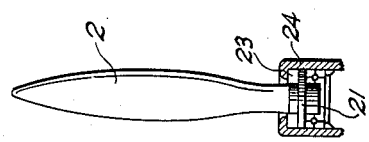
Figure 3 is the representation of a completed blade with the thrust bearing in operative position.

As a method of manufacture, in the event that the blades are of the hollow steel type or of a type in which the flange 21 is formed first and the blade shaped afterwards, as shown in Figures 2 and 3, the bearing 23 may be applied to the heated blade after the flange 21 has been formed, but just before the blade has been pressed to its final shape. After the machining operations on the blank have been performed, the blank may be heated to a temperature suitable for pressing it to final shape, and, while it is thus heated, the bearing 23 may be slipped over the tip end of the blank, as shown in Figure 2, and moved to its normal position adjacent to the flange 21. The blank is then placed in a press and flattened in dies to the desired propeller shape, with the bearing 23 retained permanently in position as shown in Figure 3.

Still another method of manufacturing is to complete the blade with the exception of forming the flange 21. The shank of the blade is then heated to suitable temperature and the bearing 23 is slipped loosely over the root of the heated blade and moved on the shank to a position some distance from the end of the shank. The flange 21 is then formed by an upsetting process in the usual manner. The bearing 23 may be moved a considerable distance from the end of the shank, permitting the upsetting of the shank end without damage to the bearing. The flange 21 and the exterior of the shank are then machined to provide accurate seating surfaces, after which the bearing 23 is moved down the shank to engage the seating surfaces. In case the blades used are of a light alloy requiring heat treatment after the upsetting operation to develop the full strength of the material, it is desirable to utilize bearings made of special steel of such characteristics that its hardness is not affected by the temperature used in heat treating the metal of the blade.

After the bearing 23 has been applied to the bladeshank, the sleeve 11, which is preferably of steel, may be inserted. As shown, the exterior of the sleeve 11 is tapered to fit a complementary tapered surface on the interior of the blade shank. Sleeve 11 is made to fit accurately within the blade shank and is placed in position by first moderately heating the blade, as for instance by dipping the shank in hot oil, after which the sleeve 11 is pressed into the hollow root of the blade to bring its flange 14 into contact with the flange 21 of its blade root. After the blade cools, it shrinks into very firm engagement with the sleeve 11. However, in so shrinking, the shank causes the sleeve 11 to contract, and some distortion may result. To correct this, the bearing surfaces 12 and 13 on the interior of the sleeve 11 are accurately lapped to their final dimensions.

These surfaces, as well as their complementary surfaces on the spider or stud 6, may be hardened by nitriding or the like to provide hard wearing surfaces. The bearing surfaces may be lubricated by graphite or similar material which may be placed in an annular chamber 28 adjacent to the annular bearing surfaces 16. The action of centrifugal force will force the lubricant outwardly to lubricate the bearing surfaces 12 and 13.

As shown, the inner end of the sleve 11 is reduced to what is known as a feather edge to permit it to flex with the blade during flight and thus avoid concentration of stress in the blade at the end of the sleeve. It is highly important in propeller construction to avoid all localization of stress. Fatigue cracks usually start from that condition.

By fitting the blades 2 in this manner very accurately and tightly on the studs 6 of the hub 1, wear between the blades and the hub is reduced to a minimum. During flight there is constant vibration in the propeller structure, particularly in the blades, and if looseness occurs between the blades and the hub, relative motion will result in destructive abrasion.

Although the blades 2 are fitted closely to the hub 1, it is possible by means of suitable apparatus, such as is completely described in the parent application, Serial No. 531,685, filed April 21, 1931, which has now matured into Patent No. 2,032,254, issued February 25, 1936 of which the present application is a division, to turn the blades 2 for adjusting the pitch angle thereof, by means of an operating lug 31 formed integral with the flange 14 of the sleeve 11 and extending through a slot 32 in the barrel 24. The slot 32 is made of such length that the blade may be turned through a predetermined maximum angle of adjustment, but is prevented from turning to a position beyond the predetermined range. In a particular practical embodiment of my invention, a torque of substantially 2000 lbs. inches is required to move the two blades 2 relative to the spider.

The particular structure shown and the descriptions thereof are for the purpose only of disclosing complete and workable apparatus and it will be obvious to others skilled in the art that various modifications in the details may be made without departing from the scope of the invention defined in the appended claims.

What I claim is:

1. The method of making a blade for a controllable pitch propeller comprising the steps of forming a body portion of metal with a hollow shank, removing material from the inner surface of the shank to give it a predetermined size and shape, machining a sleeve to fit the shank opening, heating the shank, pressing the sleeve in the shank opening while the shank is heated, and after the shank has cooled lapping the interior of the sleeve to predetermined dimensions to form a bearing surface.

2. The method of making a propeller blade for an adjustable pitch propeller comprising the steps of forming a hollow shell of circular cross section, forming a flange at the end of the shell, heating the shell, slipping a bearing onto the shell to a position adjacent to the flange, and while the shell is still heated, pressing it into the shape of a propeller blade.

3. The method of making a blade for a controllable pitch propeller that comprises forming a blade body portion having a hollow shank, heating the shank, placing a bearing raceway on the heated shank and moving it towards the tip of the propeller beyond its operating position, upsetting the heated end of the shank to form a flange, machining the flange and the shank after it has cooled to fit the bearing, moving the bearing on to the machined portion of the shank, machining the interior of the hollow shank, heating the shank end to expand it, pressing a sleeve into the shank while the shank is heated, and after the shank has cooled machining the interior of the sleeve to predetermined dimensions.

4. The method of making a propeller blade comprising forming a flange at one end of a bar of material from which the blade is to be formed, placing a bearing ring over the bar and positioning it adjacent the flange at one end of the bar and then forming the blade of such size that the ring cannot be slipped thereover from the other end of the bar.

5. The method of making a propeller blade comprising the steps of forming an enlarged portion at one end of a bar of material from which the blade is to be formed, heating said bar, passing a ring constituting at least a portion of a bearing over said heated bar and positioning said ring adjacent said enlarged portion, and then deforming said heated bar to give it a propeller blade shape which will retain the bearing thereon.

6. In the method of making a propeller blade having a flanged end portion and a thrust transmitting ring carried by said blade for coaction with said flange in which the relative sizes of the finished blade, the flange and the ring are such that the ring is retained between the flange and the blade portion, the steps of placing the ring adjacent the flange on a flanged bar of stock and then deforming a portion of said bar as a step in forming said blade.

FRANK W. CALDWELL.